(12) United States Patent
Cord et al.

(10) Patent No.: US 7,992,896 B2
(45) Date of Patent: Aug. 9, 2011

(54) GAS GENERATOR FOR A SAFETY SYSTEM

(75) Inventors: Paul-Philippe Cord, Paris (FR); Fabien Béteille, Revel (FR); Sylvie Martinel, legal representative, Revel (FR)

(73) Assignee: Seva Technologies (FR)

( * ) Notice: Subject to any disclaimer, the term of this patent is extended or adjusted under 35 U.S.C. 154(b) by 119 days.

(21) Appl. No.: 12/086,469

(22) PCT Filed: Dec. 13, 2006

(86) PCT No.: PCT/FR2006/051342
§ 371 (c)(1),
(2), (4) Date: Aug. 12, 2009

(87) PCT Pub. No.: WO2007/068856
PCT Pub. Date: Jun. 21, 2007

(65) Prior Publication Data
US 2010/0007123 A1    Jan. 14, 2010

(30) Foreign Application Priority Data

Dec. 15, 2005 (FR) ..................................... 05 12745

(51) Int. Cl.
*B60R 21/26* (2006.01)
(52) U.S. Cl. .................. 280/736; 280/741; 280/742
(58) Field of Classification Search .................. 280/736, 280/737, 741, 742
See application file for complete search history.

(56) References Cited

U.S. PATENT DOCUMENTS

| 5,897,136 | A | | 4/1999 | Okada et al. | |
|---|---|---|---|---|---|
| 6,012,737 | A | * | 1/2000 | Van Wynsberghe et al. | 280/737 |
| 6,871,873 | B2 | * | 3/2005 | Quioc et al. | 280/741 |
| 7,343,862 | B2 | * | 3/2008 | McCormick | 102/530 |
| 7,568,728 | B2 | * | 8/2009 | Smith et al. | 280/736 |
| 7,814,838 | B2 | * | 10/2010 | McCormick | 102/530 |
| 7,845,679 | B2 | * | 12/2010 | Abaziou | 280/736 |
| 2003/0101893 | A1 | | 6/2003 | Cord | |

FOREIGN PATENT DOCUMENTS

| DE | 198 22 654 A1 | 11/1999 |
|---|---|---|
| WO | WO 01/89885 A | 11/2001 |

* cited by examiner

*Primary Examiner* — Toan C To
(74) *Attorney, Agent, or Firm* — DLA Piper LLP (US)

(57) ABSTRACT

A gas generator for a safety system includes an explosible charge formed at least by a primary pyrotechnic compound, in a first chamber initiated by at least one initiator provided with a reinforcing charge and a secondary compound, in a second chamber, the decomposition of which is entailed by products of combustion of the primary compound, an interaction of the products of combustion of the primary compound and those of the secondary compound through an oxidation-reduction reaction occurring in a slightly confined volume, the first chamber communicating with said second chamber through a central nozzle and said second chamber being provided, at a first zone close to said first chamber, with orifices that discharge the gases and contain, in a second zone, said secondary compound; and means forming an obstacle to the passage of the gases installed in said second chamber between said first and second zones, said obstacle-forming means allowing the gases to pass into a central part and forming an obstacle to their passage into a peripheral part with sufficient transparency for the gas interaction volume to be slightly confined.

16 Claims, 5 Drawing Sheets

GAS GENERATOR FOR A SAFETY SYSTEM

RELATED APPLICATIONS

This is a §371 of International Application No. PCT/FR2006/051342, with an international filing date of Dec. 13, 2006 (WO 2007/068856 A1, published Jun. 21, 2007), which is based on French Patent Application No. 05/12745, filed Dec. 15, 2005.

TECHNICAL FIELD

This disclosure relates to the field of safety systems for the protection of property and/or persons, more particularly in a motor vehicle. It more particularly relates to a gas generator connected to a shock-absorbing airbag including an explosible charge formed by at least a primary pyrotechnic compound and a secondary compound.

BACKGROUND

WO 01/89885 discloses a gas generator. In such a system, the products of combustion of the primary pyrotechnic compound entail the decomposition of a secondary compound. The primary compound is contained in a primary chamber associated with an initiator provided with a reinforcing charge. At least one interaction of the products of combustion of the primary compound and those of the secondary compound occurs through an oxidation-reduction reaction in a slightly confined volume. Slightly confined volume means a volume so that the pressure of the gases reacting in such volume is less than a few hundred bars. For example, such slightly confined volume may be composed by a first zone of a secondary chamber, a second zone of which contains the secondary compound. Orifices for discharging gases are provided around such reaction zone. Advantageously, the reaction zone is arranged between the primary chamber and the secondary compound storage zone.

In a preferred construction of WO '885, the secondary compound is in the form of a powdery solid compound, generally ammonium nitrate. Now, a risk exists that the powder might be ejected through the orifices for discharging the gases prior to the total decomposition of the secondary compound.

It could therefore be helpful to improve the gas generator described in WO '885 to prevent such risk.

SUMMARY

We provide a gas generator for a safety system including an explosible charge formed at least by a primary pyrotechnic compound, in a first chamber initiated by at least one initiator provided with a reinforcing charge and a secondary compound, in a second chamber, the decomposition of which is entailed by products of combustion of the primary compound, an interaction of the products of combustion of the primary compound and those of the secondary compound through an oxidation-reduction reaction occurring in a slightly confined volume, the first chamber communicating with the second chamber through a central nozzle and the second chamber being provided, at a first zone close to the first chamber, with orifices that discharge the gases and contain, in a second zone, the secondary compound; and means forming an obstacle to the passage of the gases installed in the second chamber between the first and second zones, the obstacle-forming means allowing the gases to pass into a central part and forming an obstacle to their passage into a peripheral part with sufficient transparency for the gas interaction volume to be slightly confined.

BRIEF DESCRIPTION OF THE DRAWINGS

The gas generator will be better understood when reading the following description given only as an explanation of several examples, while referring to the appended drawings.

DETAILED DESCRIPTION

We provide a gas generator for a safety system comprising an explosible charge formed at least by a primary pyrotechnic compound in a first chamber, initiated by at least one initiator provided with a reinforcing charge and a secondary compound in a second chamber, the decomposition of which is entailed by products of combustion of the primary compound, an interaction of the products of combustion of the primary compound and those of the secondary compound through an oxidation-reduction reaction occurring in a slightly confined volume, the first chamber communicating with the second chamber through a central nozzle and the second chamber being provided in a first zone close to the first chamber with peripheral orifices for discharging the gases and containing in a second zone the secondary compound, characterized in that a means forming an obstacle to the passage of the gases is installed in the second chamber between the first and second zones, the obstacle-forming means allowing the gases to pass into a central part and forming an obstacle to their passage into a peripheral part with sufficient transparency for the gas interaction volume to be slightly confined.

The propellant jet which entails the decomposition of the secondary charge travels into the second zone because of the presence of a peripheral obstacle at the inlet of such zone which creates a recirculation volume in which the temperature is maximum and the kinetic energy minimum. This results in the powder not being ejected, as this is the case in known devices.

Advantageously, the obstacle-forming means has a transparency between 40 and 60%. Thus, an actual peripheral obstacle to the passage of the gases is arranged and the interaction volume remains slightly confined. Advantageously, the obstacle-forming means has a transparency of 50%.

According to a preferred construction, the obstacle-forming means is a grid provided with a diamond-shaped mesh and provided with a circular central orifice. In an alternate solution, the obstacle-forming means is a metal plate provided with circular holes positioned around a circular central orifice having a greater diameter.

The grid or the perforated plate, unlike those which are sometimes used in the prior art, such as in DE 198 22 654, cannot hold the secondary charge. The dimensions of the openings of the grid or the perforated plate are thus advantageously greater than the size of the powder grains and ensure that the grid keeps, under any circumstance, a sufficient transparency for the interaction volume to remain slightly confined. For example, such openings have a diameter between 2 and 6 mm for a powder grain size generally between 5 and 500 microns. This makes it possible to avoid the risk that the powder might clog the openings, thus limiting the discharging of the gases.

The circulation which is created because of the presence of the grid or the perforated plate results in a low thrust distributed on a powder bed. The part of the powder which does not react is slightly stressed and is not exposed to the risk of being driven beyond the grid prior to the decomposition.

In some cases, the secondary charge is in the form of granules or pellets having a size greater than one millimeter. In this case, the openings cannot be clogged and the size thereof is less important, provided that the obstacle-forming means has a transparency allowing on the one hand that the interaction volume remains slightly confined and, on the other hand, that the circulation which is created because of the presence of the grid or plate is satisfactory.

Advantageously, the obstacle-forming means is made of stainless steel and has a thickness between 0.5 and 1.5 mm. Advantageously, the grid or perforated plate made of stainless steel has a thickness between 0.7 and 1 mm. Alternately, the grid or perforated plate is made of aluminum and has a thickness between 1 and 3 mm. Stainless steel and aluminum are two materials compatible with ammonium nitrate.

Alternately, the circular central orifice is substituted with a central zone having a lower thickness so designed as to be broken by the jet of gases from the nozzle.

Advantageously, the obstacle-forming means is held by an annular shoulder arranged on the inner periphery of the second chamber between the first and second zones.

The presence of the obstacle-forming means ensures the total combustion of the powder inside the gas generator so that there is no powder ejected.

According to another aspect, the size of the peripheral orifices for discharging the gases is such that the operating pressure in the second chamber is between 50 and 250 bars. Advantageously, the operating pressure is between 100 and 200 bars.

Advantageously, an internal device sealing the discharging orifices provides the closing of such orifices, the device being so designed as to break when the pressure in the second chamber reaches a given level. Advantageously, the pressure level for which the sealing inner device breaks is between 30 and 170 bars. Advantageously, the pressure level is between 70 and 130 bars.

Advantageously, the device is a metallic strip held on the inner wall of the chamber by another metallic part or an adhesive.

According to yet another aspect, the second part of the second chamber containing the secondary compound is sealed using a safety relief disk so arranged as to break under the pressure of the gas from the nozzle. Advantageously, the safety relief disk includes star-shaped incipient break lines. These can be zones having a smaller or previously reduced thickness. Alternatively, the whole safety relief disk may have a smaller thickness.

According to still another aspect, the safety relief disk is provided against the obstacle-forming means. Alternately, the means is directly equipped with a safety relief disk.

Advantageously, the nozzle has a cup-and-ball shaped opening with a central cylindrical part and two flares. Advantageously, such flares have an opening angle between 10° and 120°. This shape makes it possible to create and adjust an energy density facilitating the ignition of ammonium nitrate.

Advantageously, the second chamber is closed by a plug designed for being introduced into the second chamber and including a peripheral recess making it possible to crimp it.

According to another aspect, the secondary compound comprises ammonium nitrate and a reducing additive based on guanidine derivatives. Advantageously, the guanidine-based additive includes guanidine nitrate, possibly with an anti-caking additive. Alternatively, the guanidine-based additive includes nitroguanidine with small grains, stabilized more particularly with the intrinsic impurities thereof.

The obstacle-forming means may be composed, according to a less advantageous alternative, by a restriction of the diameter in the secondary chamber which is small enough for the reaction volume to remain slightly confined. For example, this can be a restriction of diameter to 21.5 mm for a chamber having a diameter of 30 mm.

It should be noted that one possible use of the gas generator is the actuation of a seat belt pre-tensioner.

It should be noted that another use of the gas generator includes pressurizing enclosures or jacks.

The methods for implementing the gas generator for a safety system are identical with the description in WO '885 and will not be further described hereinafter. Besides, the general architecture of the gas generator is close to the gas generator described therein and the common elements will not be described in greater details.

Turning now to the Drawings, the gas generator 1 is a gas generator for a safety system such as an airbag. It includes an explosible charge formed by a primary pyrotechnic compound and a secondary pyrotechnic compound. The stream of the combustion gas of the primary compound heats the secondary compound, the decomposition of which is thus entailed. The gases produced by the primary compound and by the secondary compound interact in a slightly confined volume through an oxidation-reduction reaction.

The primary pyrotechnic compound is composed of a propellant. A secondary compound mainly comprises ammonium nitrate and a guanidine-based reducing additive.

Figure 1:
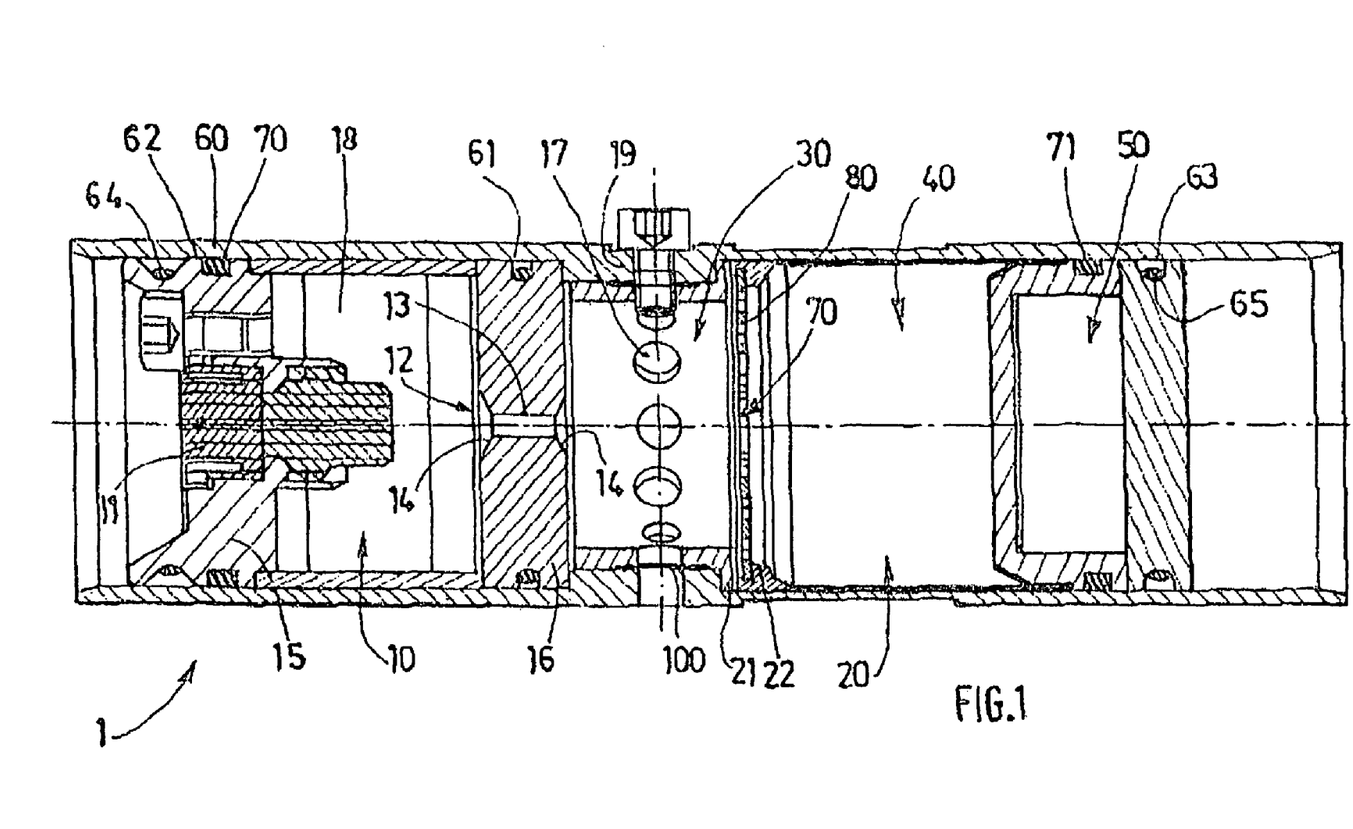
FIG. 1 illustrates a longitudinal cross-sectional view of a first alternative of the gas generator.

A gas generator is contained in a thick-walled cylindrical sleeve 60.

A primary element 10 includes an initiator 11 provided with a reinforcing charge and a primary chamber 18 containing the primary pyrotechnic compound.

The primary element 10 has a cylindrical shape adapted to the introduction into the sleeve 60. A rear part 15 bearing the initiator 11 is provided with a peripheral recess 62 making it possible to crimp the primary element into the sleeve and so adapted as to receive a sealing gasket 64. It is also provided with a second recess positioned further inside the device and adapted to receive a sealing gasket 70.

An intermediate element between the primary compound and the secondary compound consists in a disk 16 having a diameter corresponding to the inner diameter of the sleeve 60 to close the primary chamber. An outlet of the nozzle type 12 is arranged in the central part of such element 16.

The sleeve 60 is provided with an inner peripheral extra thickness 19 which forms an annular restriction. Such annular restriction forms a shoulder against which the disk 16 abuts. The disk 16 is provided with a peripheral recess 61 containing a sealing gasket.

The nozzle 12 is arranged at the center of the disk 16 so that it extends along the central axis of the gas generator 1. Such nozzle has a cup-and-ball shaped opening with a central cylindrical part 13 and two flares 14 at 120°.

A secondary element 20 includes a secondary chamber, a first zone of which is composed of a reaction chamber 30 wherein the post-combustion occurs and a second zone is composed of a chamber 40 containing the secondary compound.

The reaction chamber 30 has a cylindrical form and it is made of a hollow cylinder having an outer diameter adapted for the insertion into the sleeve 60 at the inner peripheral extra thickness 19 forming an annular restriction. The length of such annular restriction corresponds to the length of the chamber 30. The chamber forming the cylinder 30 is provided with an outer annular rim 21 which abuts against the extra thickness 19. This rim 21 has a contact surface against which the grid-safety relief disk assembly may abut, as will be described hereinafter. The chamber 30 is provided with peripheral orifices for discharging the gases positioned at regular spaces and corresponding to orifices arranged in the sleeve 60.

The chamber containing the secondary compound 40 is made of a hollow cylinder having an outer diameter designed for the insertion into the sleeve 60. Such cylinder is open at the end thereof which is oriented towards the primary compound and closed at the other end thereof.

A plug 50 having a diameter adapted to the insertion into the sleeve 60 includes a peripheral recess 63 making it possible to crimp it and so designed as to receive a sealing gasket. In addition, such plug includes a second recess, closer to the inside of the gas generator and making it possible to fit a sealing gasket 71.

In operation, the chambers 30 and 40 are communicating so that the interaction of the products of combustion of the primary and secondary compounds occurs in a slightly confined volume. However, a separating assembly 70 is interposed between such chambers 30 and 40. As can be seen in FIG. 1, such separating assembly is sandwiched between the cylinder of the chamber 30 against the rim 21 of which it abuts and the cylinder of the chamber 40. While referring to FIGS. 1 to 4, such separating assembly 70 includes partitioning means 90 so designed as to break under the pressure of the gases delivered by the nozzle 12 and means 80; 180 forming an obstacle to the passage of the gases so designed as to allow the gases to pass into a central part 81; 181 around the axis of the gas generator and to form an obstacle to the passage thereof into a peripheral part 84; 184 with a sufficient transparency for the gas interaction volume to be slightly confined.

Figures 2, 3, 4:
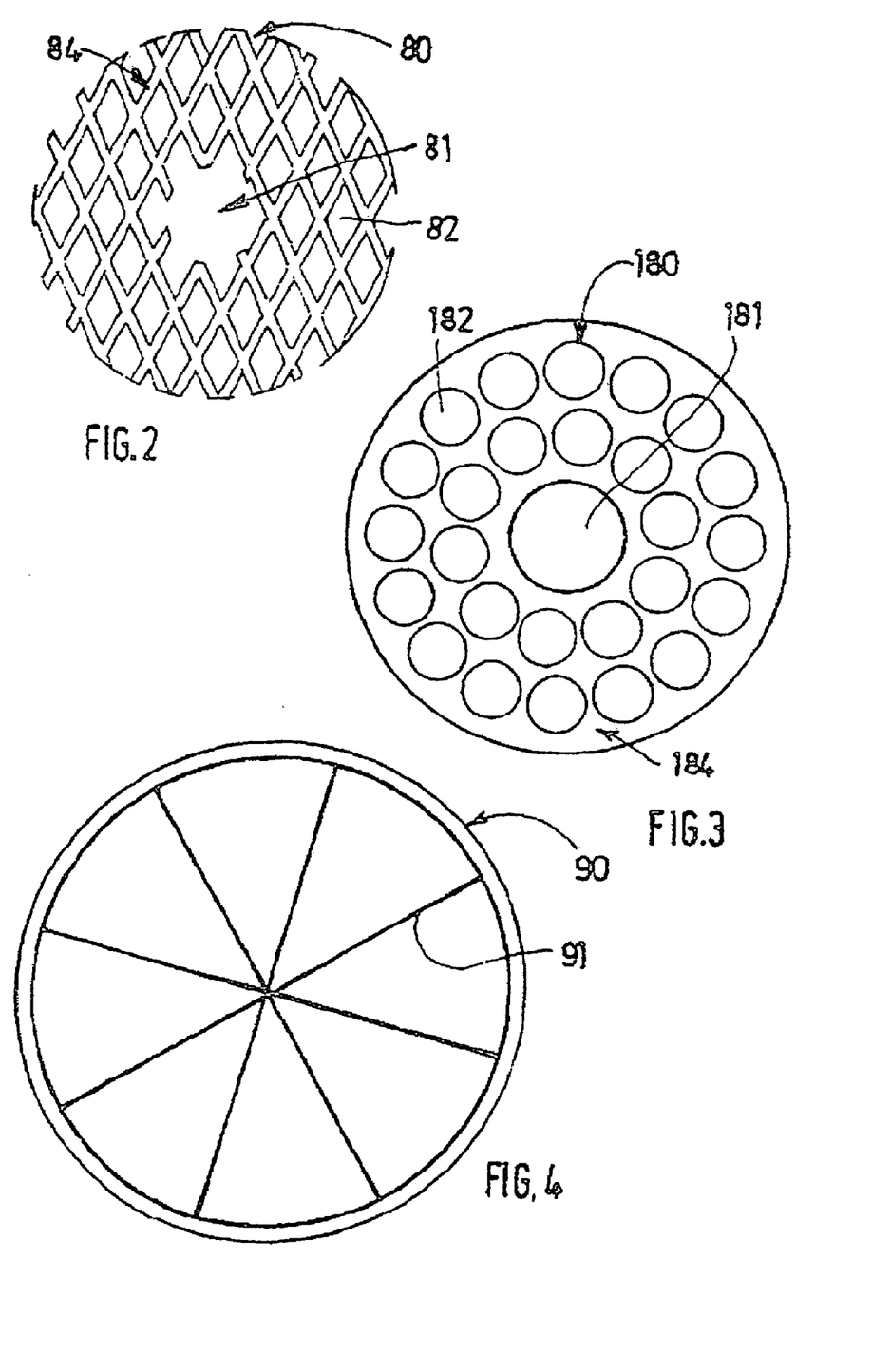
FIG. 2 illustrates a plan view of a grid for the gas generator of FIG. 1.
FIG. 3 illustrates a plan view of a grid for the gas generator of FIG. 1 according to another construction.
FIG. 4 illustrates a plan view of a safety relief disk for the gas generator of FIG. 1.

While referring to FIG. 2, the obstacle-forming means is a grid made of stainless steel 80 provided with diamond-shaped mesh 82 provided with a circular central orifice 81. Such obstacle-forming means—with a transparency of 50%—acts against the shrinkage 22 at the end of the chamber and thus covers the whole communication surface between such chamber 40 and the chamber 30. For example, in the case of a sleeve 60 having a diameter of 35 mm, the grid has a diameter of 32.2 mm, the central orifice has a diameter of 8 mm and the mesh wires have a diameter of 0.8 mm and the mesh dimensions are 4 mm×8 mm. Such grid has a low thickness. For example, the thickness of the grid is 0.8 mm.

FIG. 3 shows means forming an obstacle to the passage of the gases according to a second construction. This is again a stainless steel grid but, this time, it is made of a metal plate 180 wherein circular holes 182 have been provided and positioned in two circles around a central orifice 181 having a greater diameter which corresponds to the diameter of the orifice 81 of the grid 80.

While referring to FIG. 4, the partitioning means is a safety relief disk 90. Such safety relief disk seals the chamber 40 when at rest. The thickness of such safety relief disk is so provided that it breaks under the pressure of the gases delivered by the nozzle 12. To facilitate the breaking of the safety relief disk and to keep the passage of the gases clear, the safety relief disk is provided with star-shaped incipient break lines 91. They can be zones having a smaller or pre-reduced thickness.

On the other hand, while referring to FIG. 1, an inner strip 100 for sealing the discharging orifices 17 is provided between the cylinder of the chamber 30 and the sleeve 60, on the inner extra thickness 19. This strip ensures the sealing of such orifices when at rest. It is so designed as to break when the pressure in the second chamber reaches a given level. For example, such strip breaks when the pressure in the chamber 30 reaches about 100 bars.

It should be noted that the number and the size of the peripheral orifices for the discharging of gases 17 are provided so that the operating pressure in the second chamber is between 50 and 250 bars and more precisely between 100 and 200 bars.

It should also be noted that the secondary compound mainly comprises ammonium nitrate and a reducing additive based on guanidine derivatives. Such additive mainly comprises guanidine nitrate. In an alternative solution, the additive also includes nitroguanidine having small grains stabilized with the intrinsic impurities thereof.

It should also be noted that the primary element 10 with the initiator and the reinforcing charge, on the one hand, and the cylinder 40 containing the secondary compound with the grid and the safety relief disk constitute subassemblies which can be separately manufactured (they are easy to handle, accepted for carriage and they also can be used for other applications).

Figure 5:
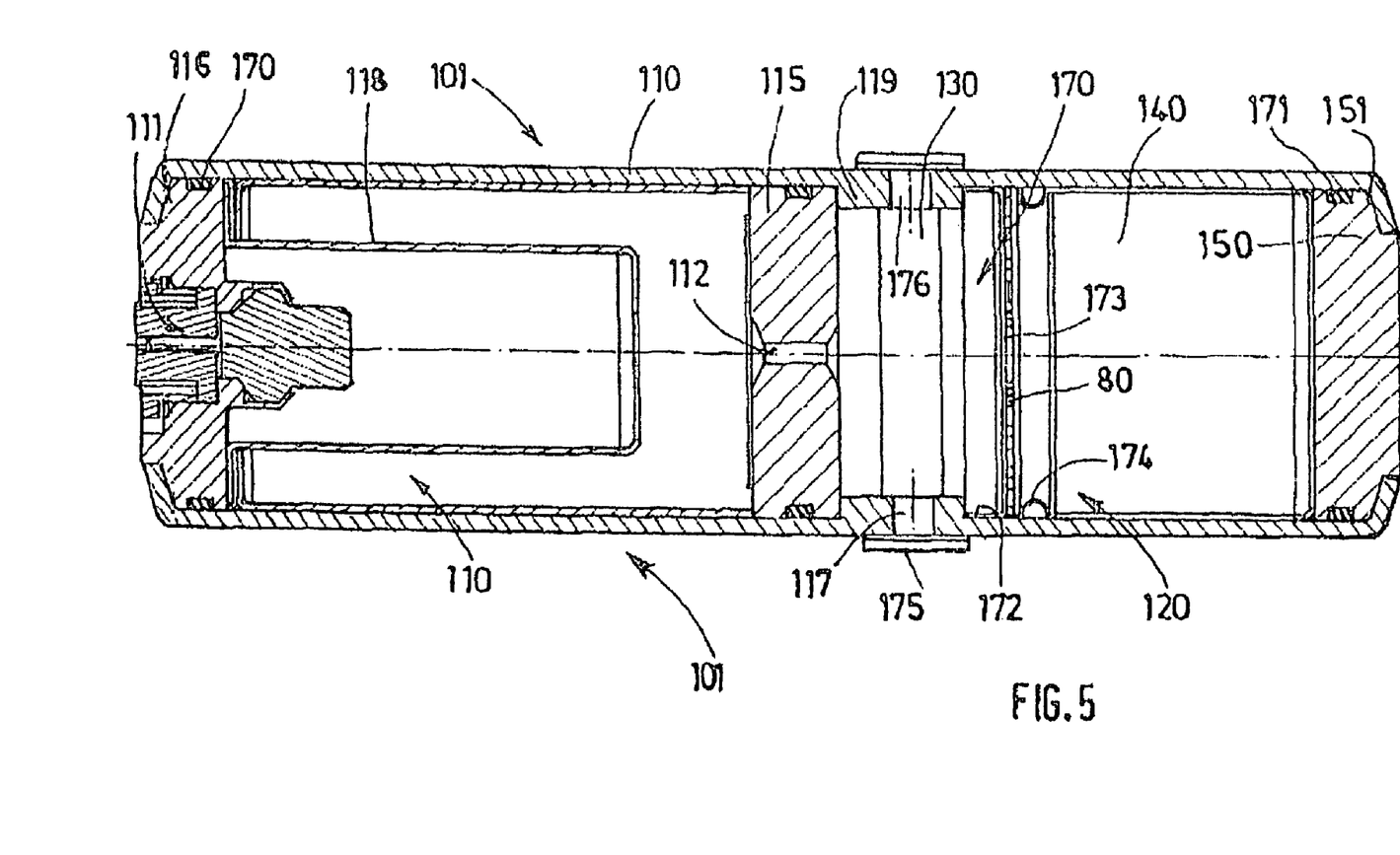
FIG. 5 illustrates a longitudinal cross-sectional view of a second alternative of the gas generator.

FIG. 5 shows an alternative construction. A gas generator 101 is contained in a cylindrical sleeve 160.

A primary element 110 includes an initiator 111 provided with the reinforcing charge and a primary chamber 118 containing the primary pyrotechnic compound.

The primary element 110 has a cylindrical shape adapted to the introduction into the sleeve 160. A rear part is provided with the peripheral recess adapted for receiving a sealing gasket 170.

The crimping of the primary element is not obtained as in the previous construction, by punching a peripheral part of the sleeve into a groove arranged in the primary element but by the turned edge crimping of the rear end of the sleeve against the rear surface 116 of the primary element.

An intermediate element 115, provided with a nozzle 112, is similar to the element 16 described in the previously described construction.

A secondary element 120 includes, as in the previously described construction, a secondary chamber a first zone of which is made by a reaction chamber 130 in which the post-combustion occurs and a second zone is made by a chamber 140 containing the secondary compound.

The reaction chamber 130 is defined by an inner peripheral extra thickness 119 which forms an annular restriction for the sleeve 160, as in the previous construction.

The chamber containing the secondary compound 140 is made by a hollow cylinder having an outer diameter adapted to the insertion into the sleeve 160. Such cylinder is open at the end thereof which is directed towards the primary chamber and closed at the other end thereof.

A plug 150, having a diameter adapted to the introduction into the sleeve 160 includes a peripheral recess allowing the fitting of a sealing gasket 171. The crimping of the plug is not carried out as in the previous construction, by punching a peripheral part of the sleeve into a recess provided in the plug, but by the turned edge crimping of the front end on the sleeve against the front surface 151 of the plug.

As in the previous construction, a separating assembly 170 is interposed between the chambers 130 and 140, such element comprising partitioning means so arranged as to break under the pressure of the gases delivered by the nozzle 112 and a grid 80.

The partitioning assembly 170 is supported by a plug the body of which is composed of a partitioning safety relief disk 173 of the type described in FIG. 1 and a cylindrical peripheral rim 172 resting against the inner peripheral extra thickness 119 of the sleeve 160. The grid 80 comes to rest against the partitioning safety relief disk 173. The grid 80 is thus pushed away from the end of the inner peripheral extra thickness 119 of the sleeve 160 by a distance corresponding to the length of the rim 172.

On the other hand, the grid 80 abuts against an inner shoulder 174 arranged close to the opening of the chamber 140. The grid is thus sandwiched between the plug 173 and the shoulder 174. In practice, the shoulder 174 is made by punching towards the inside of the chamber 140.

An outer strip 175 intended for sealing the discharging orifices 17 is provided on the periphery of the sleeve 160. It is composed of a metal part so designed as to deform under the pressure of the gases when the pressure in the second chamber reaches a given level, so as to act as a deflector. For example, such strip gets deformed under a pressure in the chamber 30 of about 100 bars. In addition, an inner sealing strip 176 identical to that described in the preceding example extends against the holes 117.

The primary element 110 with the initiator and the reinforcing charge on the one hand, and the cylinder 140 containing the secondary compound with the grid and the safety relief disk are subassemblies which can be manufactured separately. The secondary subassembly is very easily manufactured since it is sufficient first to fill the cylinder with the mixture, then to position the grid and eventually to fix the plug.

Figure 6:
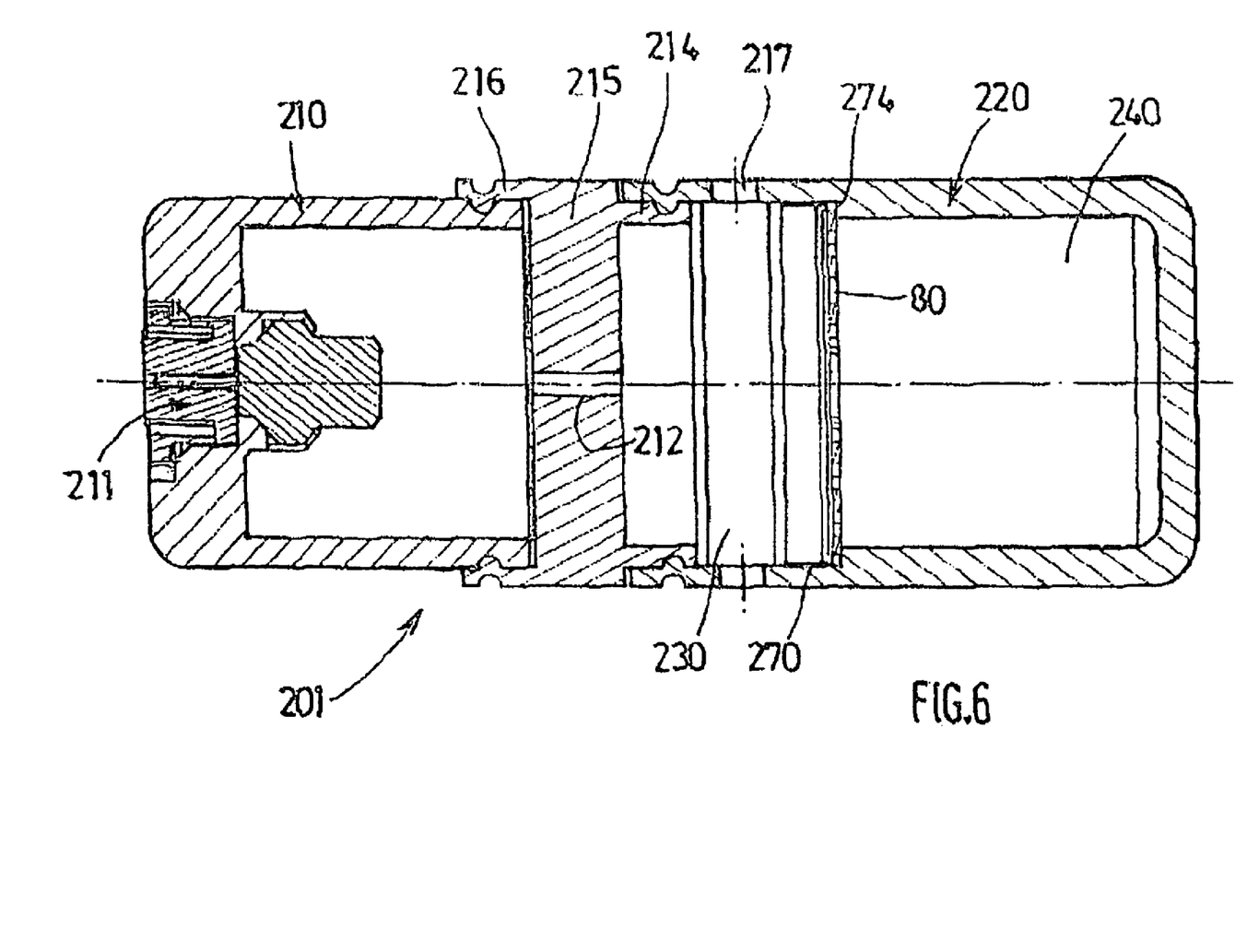
FIG. 6 illustrates a longitudinal cross-sectional view of a third alternative of the device.

FIG. 6 shows still another alternative construction.

In this alternative solution, no sleeve is provided since the primary and secondary elements composed of thick walled cartridges are directly attached on a central part wherein a nozzle 212 is provided.

The central part 215 is a disk the two ends of which are provided with coaxial cylindrical sleeves 216 and 214, the sleeve 216 having the same diameter as the disk 215 whereas the sleeve 214 is slightly smaller.

A primary element 210 includes a thick walled cylindrical element with one end closed, inside which an initiator 211 provided with the reinforcing charge can be accommodated. The other end, which is open, is provided to be fitted inside the sleeve 216 so that the disk 215 completely closes the inside of the element 210, thus defining a primary chamber connected to the secondary chamber through the nozzle 212. Advantageously, a safety relief disk is positioned on the open part of the primary element 210 to close the chamber 210 prior to the mounting on the central part 215. Such safety relief disk is so designed as to be broken at the level of the nozzle under the pressure of the gases. The primary element is crimped on the central element.

A secondary element 220 includes a thick walled cylindrical part, which is closed at one of its ends and opened at the other end thereof. The wall of such secondary element is thinner at the open end, behind a shoulder 274. The inner diameter of such secondary element at the thinner end thereof corresponds to the outer diameter of the cylinder 214 so that the latter is adapted to be fitted into the secondary element.

A grid 80 is adapted to be fitted inside the secondary element 220 and to abut against the shoulder 274. A plug 270 provided with a safety relief disk adapted to be broken by the pressure of the gases, such as in the previous example, is interposed between the grid and is a cylindrical part forming a post-combustion chamber 230 provided with discharging holes communicating with the discharging holes 217 provided on the periphery of the element 220. The chamber 230 abuts against the end of the cylinder 214 when being fitted thereon so that the assembly composed of the grid, the plug and the chamber is fixed inside the secondary element 220. The locking of the secondary element on the central element is obtained by crimping.

The secondary cartridge 220 can be manufactured separately (filling with the mixture, positioning of the grid and closing of the plug by welding). Similarly, the primary cartridge 210 together with the initiator and the reinforcing charge can be manufactured separately (filling with the mixture and closing by welding or gluing of the safety relief disk).

Figure 7:
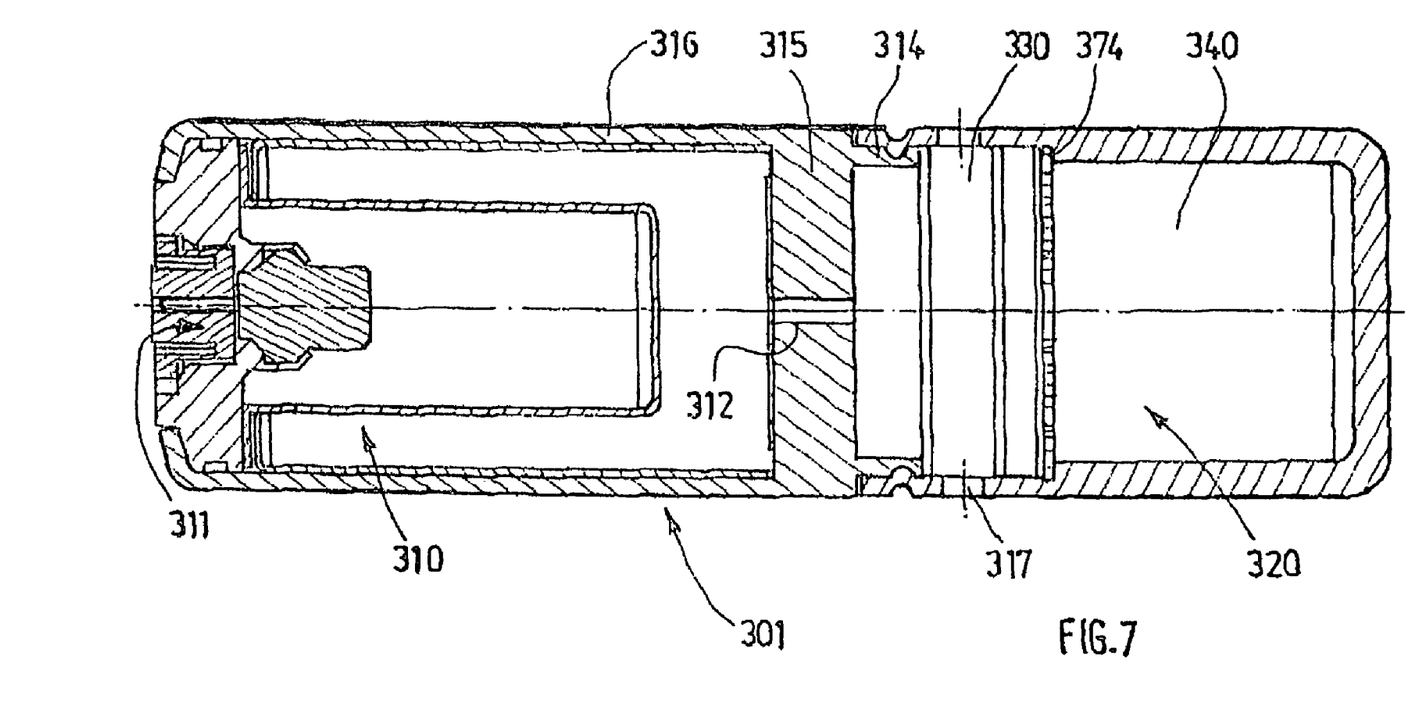
FIG. 7 illustrates a longitudinal cross-sectional view of a fourth alternative of the gas generator.

FIG. 7 shows still another alternative construction.

Such alternative construction is similar to the previous one, provided that the sleeve 314 of the central part 315 is not attaching means of a thick walled cartridge, but it is a thick walled sleeve in which a primary element 310 is inserted exactly in the same way as in the construction described while referring to FIG. 5, the end of the sleeve being crimped on the rear surface of the primary end. The secondary element 320 is, as in the previous example, a thick walled cartridge which is attached to the central part 315.

As in the previous examples, the primary and secondary elements can be manufactured separately.

The generators disclosed hereinabove are examples. It should be understood that those skilled in the art may make modifications without departing from the scope of the disclosure as defined in the appended claims.

The invention claimed is:

1. A gas generator for a safety system comprising:
   a first chamber containing an explosible charge formed at least by a primary pyrotechnic compound initiated by at least one initiator provided with a reinforcing charge;
   a second chamber containing a secondary compound, the decomposition of which is controlled by products of combustion delivered by the primary compound, wherein an interaction of the products of combustion of the primary compound and those of the secondary compound through an oxidation-reduction reaction occur in a slightly confined volume,
   wherein the first chamber communicates with said second chamber via a central nozzle,
   said second chamber being provided at a first zone adjacent said first chamber with orifices that discharge the gases and contain, in a second zone, said secondary compound; and
   means forming an obstacle to a passage for the gases in said second chamber between said first and second zones, said obstacle-forming means allowing the gases to pass into a central part and forming an obstacle to their passage into a peripheral part with sufficient transparency for the gas interaction volume to be slightly confined.

2. The gas generator according to claim 1, wherein the obstacle-forming means has a transparency between 40 and 60%.

3. The gas generator according to claim 2, obstacle-forming means has a transparency of 50%.

4. The gas generator according to claim 1, wherein the obstacle-forming means is a grid provided with a diamond-shaped mesh and provided with a central orifice.

5. The gas generator according to claim 1, wherein the obstacle-forming means is a metal plate provided with circular holes positioned around a circular central orifice having a larger diameter.

6. The gas generator according to claim 4, wherein the obstacle-forming means is made, of stainless steel and has a thickness between 0.5 and 1.5 mm.

7. The gas generator according to claim 4, wherein the obstacle-forming means is made of aluminum and has a thickness between 1 and 3 mm.

8. The gas generator according to claim 4, wherein the obstacle-forming means is held by an annular shoulder arranged on the inner periphery of said second chamber between said first and second zones.

9. The gas generator according to claim 1, wherein operating pressure in the second chamber is between 50 and 250 bars.

10. The gas generator according to claim 8, having an operating pressure between 100 and 200 bars.

11. The gas generator according to claim 1, further comprising a device seal-ing said discharging orifices provides closing, of such orifices, said device being so designed as to break when pressure in the second chamber reaches a selected level.

12. The gas generator according to claim 11, wherein the pressure for which said sealing inner device breaks is between 30 and 170 bars.

13. The gas generator according to claim 1, wherein said second zone of the second chamber containing the secondary compound is sealed by a safety relief disk which breaks under pressure of gas delivered by said nozzle.

14. The gas generator according to claim 12, wherein the safety relief disk includes star-shaped incipient break lines.

15. The gas generator according to claim 1, wherein said nozzle has a cup-and-ball shaped opening with one central cylindrical part and two flares at 120°.

16. The gas generator according to claim 1, wherein the secondary compound includes ammonium nitrate and a guanidine-based reducing additive.

* * * * *